United States Patent [19]

Berning et al.

[11] Patent Number: 4,705,356
[45] Date of Patent: Nov. 10, 1987

[54] THIN FILM OPTICAL VARIABLE ARTICLE HAVING SUBSTANTIAL COLOR SHIFT WITH ANGLE AND METHOD

[75] Inventors: Peter H. Berning, Sebastopol; Roger W. Phillips, Santa Rosa, both of Calif.

[73] Assignee: Optical Coating Laboratory, Inc., Santa Rosa, Calif.

[21] Appl. No.: 630,414

[22] Filed: Jul. 13, 1984

[51] Int. Cl.⁴ .................................................. G02B 5/28
[52] U.S. Cl. ..................... 350/166; 283/91; 283/94; 283/902
[58] Field of Search .............. 283/91, 94, 114, 902; 350/164, 166, 1.6, 1.7; 356/71

[56] References Cited

U.S. PATENT DOCUMENTS 3,858,977  1/1975  Baird et al. ..................... 350/166
4,354,739  10/1982  Scanlon et al. ................. 350/166
4,370,025  1/1983  Sato et al. ...................... 350/166

OTHER PUBLICATIONS

Dobrowolski, et al.; "Optical Interference Coatings for Inhibiting of Counterfeiting", *Optical Acta*, 1983, vol. 20, No. 12, pp. 924–937.

Primary Examiner—Bruce Y. Arnold
Attorney, Agent, or Firm—Flehr, Hohbach, Test, Albritton & Herbert

[57] ABSTRACT

Thin film optically variable article having substantial color shift with varying angle of light incidence and viewing and including an optically thick, substantially transparent element carrying a colorant and having first and second surfaces. A multilayer interference coating is carried on one of said first and second surfaces. The colorant serves to modify in essentially a subtractive mode the color at normal incidence and the color shift with angle of the multilayer interference coating as seen by reflection or transmission.

28 Claims, 15 Drawing Figures

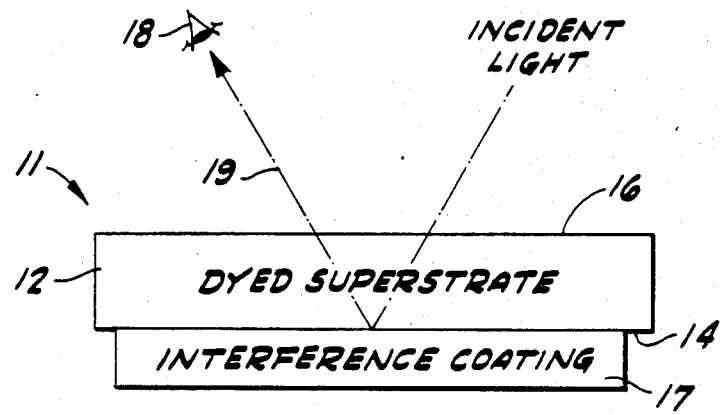
FIG_1
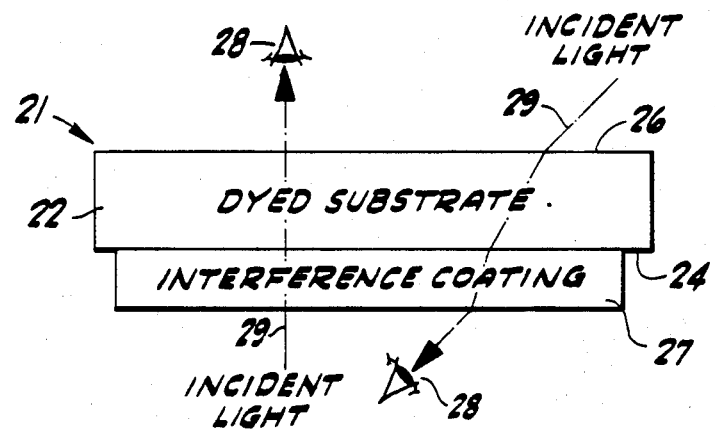
FIG_2
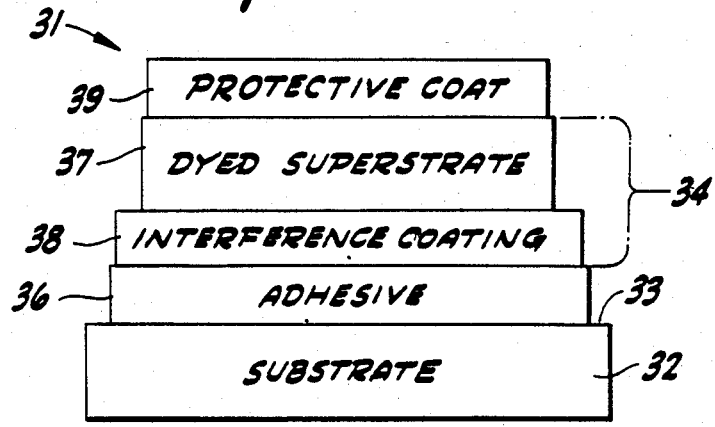
FIG_3

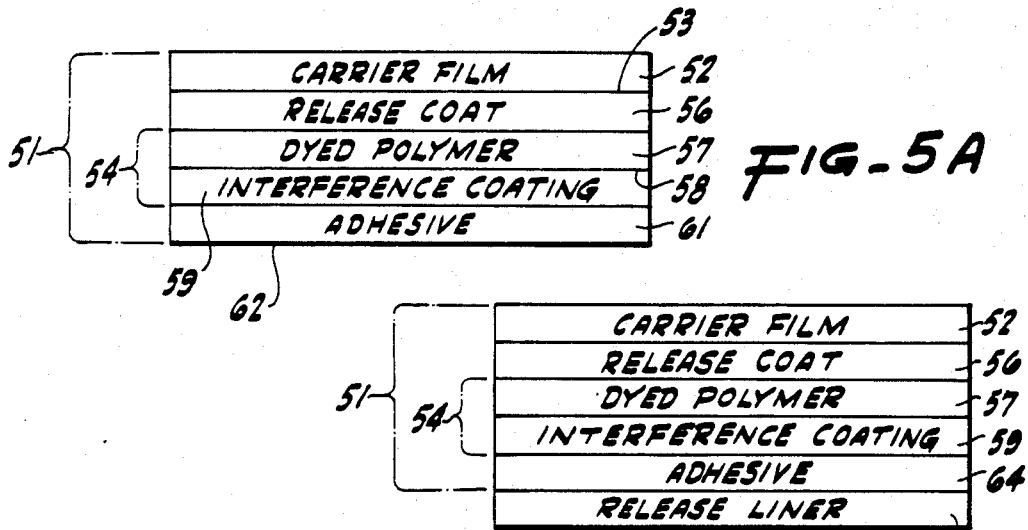
FIG.-4
FIG.-5A
FIG.-5B
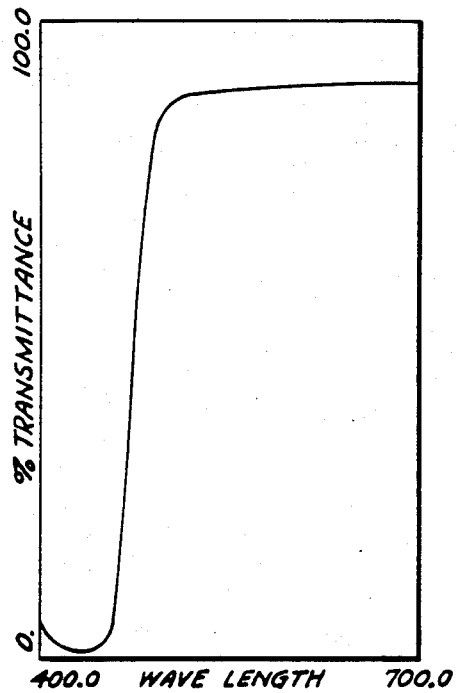
FIG.-12

THIN FILM OPTICAL VARIABLE ARTICLE HAVING SUBSTANTIAL COLOR SHIFT WITH ANGLE AND METHOD

This invention relates to thin film optically variable articles having substantial color shift with changing angle of incident light and a method of accomplishing the same.

It is well known that there are two principal sources of colors perceived from material objects. They are (1) selective wavelength absorption or scattering of light by the object and hence selective reflection or transmission of the visible spectrum and (2) wavelength-dependent interference or diffraction effects arising from superposition of reflected/transmitted wave fronts from surfaces having ordered structures with dimensions in the realm of light wavelengths. Selective absorption arises basically from the chemical composition and the interaction of the incident light with the structure of the object on an atomic level. This can occur from the bulk chemical properties of the object itself or from the presence of colorants (dyes, pigments, and other additives) in an otherwise transparent medium. Interference colors, on the other hand, are observed quite generally when light is reflected or transmitted by surfaces comprised of assemblies of essentially plane parallel, thin layers, single or multilayer, with thicknesses in the range of fractions of visible light wavelengths or from profiled surfaces of periodic structure with profile dimensions of the order of light wavelengths. Interference effects together with selective absorption can, of course, occur simultaneously in varying degree in the same object. It is also well known that selectively absorbing objects without attendant interference producing properties will quite generally display little, if any, variation in colored appearance with gradations in viewing angle, whereas surfaces comprised of thin films or gratings can display very marked shifts in colored appearance with change in angle, depending on the specific structure.

Interference colors in thin films arise from the superposition of light waves that have undergone multiple reflection and transmission within a structure consisting essentially of a series of plane parallel layers of different optical properties that are fractions of light wavelengths in thickness. The phase as well as the amplitude of the light waves in combination gives rise to wavelength dependent constructive and destructive interference effects to provide a selective filtering of incident light. The optical properties referred to are the refractive index values of the layers. For a homogenous, isotropic, non-absorbing medium, the refractive index is a real number (usually denoted by the letter "n"). If the layer is metallic in nature or, if otherwise, it shows significant absorption properties with respect to the passage of light through the layer, then the refractive index is generally characterized by a complex number of the form $N=n-ik$, where k is the absorption coefficient.

It is also well known that a colored object has associated with it a spectral reflectance curve and, if it is to some degree transparent, a spectral transmittance curve as well. The colors related to those curves can be described completely and accurately in terms of combinations of three quantities known as tristimulus values X, Y and Z which are determined mathematically as integrals of the products of three distribution functions covering the visible spectrum from about 380 to 770 nanometers (i.e., blue, green and red primaries) with the reflectance or transmittance curve of an object and the energy distribution function of the light source. Though colors can be specified in terms of the X, Y, Z tristimulus values, the colors can also be characterized equivalently by the use of normalized values $x=X/(X+Y+Z)$ and $y=Y/(X+Y+Z)$ together with the tristimulus Y value. The x,y values are known as chromaticity coordinates. As is well known to those skilled in the art of colorimetry, a very useful device known as the CIE diagram can be developed by considering the loci of x,y values in a two-dimensional plot that correspond to all real colors. This diagram is comprised of a horseshoe-shaped curve in the x,y plane enclosing the domain of all such chromaticity coordinates together with a set of contours that relate individual pairs of values to the qualitative aspects of color, namely, dominant wavelength and purity that are closely associated with the perceived attributes of hue and saturation. The tristimulus Y value, by its definition in terms of the photopic response function associated with the human eye, provides a measure of the third dimension of color, namely, luminance, which relates to the psychological attribute of brightness.

In U.S. Pat. No. 3,858,977 there is disclosed optical interference authenticating means. This authenticating means is comprised of a substrate and a filter overlying and attached to the substrate. The filter is composed of an optical interference layer or series of layers having known characteristics of spectral transmittance, and reflectance, both varying with the angle of incidence of light on the filter. The substrate has at least a portion thereof adjacent to the filter which has the property to absorb at least some of the light transmitted through the filter. The resultant color reflected by the substrate is essentially additive in its effect on the color reflected by the interference filter and hence in its effect on the overall reflected color. In general therefore, the effect is to dilute the color reflected by the filter seen by itself. The patent also discloses the use of a carrier in the form of a transparent or colored polyester film. This polyester film may be retained as a protective covering or alternatively can be removed after the filter has been attached to the substrate. There is no disclosure of the use of this carrier for any optical effects and, in particular, to provide any effects on the color of the optical interference authenticating means. The carrier merely serves as a mechanical carrier or a protective covering.

A need has arisen for colored articles in which at least a portion thereof will exhibit a rapid shift from one color to another with a change in angle of the incident light as, for example, from 0° to 45° with little, if any, intermediate color and very little, if any, color shift beyond a predetermined angle as, for example, the angle of 45°. Interference coatings can be designed that exhibit rapid shift with angle of incidence, but in general they have both intermediate and steep angle colors associated with them. There is therefore a need for a new and improved thin film optically variable article which has a substantial color shift with angle.

OBJECTS OF THE INVENTION

In general, it is an object of the present invention to provide a thin film optically variable article which has a substantial color shift with a change in the angle of incidence of reflected light and a method for accomplishing the same.

Another object of the invention is to provide an article and method of the above character in which a significant change in colored appearance occurs with a change in the angle of incidence in the range from near normal incidence of 0° to a predetermined angle as, for example, 45°.

Another object of the invention is to provide an article and method of the above character which has relatively high purity colors.

Another object of the invention is to provide an article and method of the above character which has adequate luminous reflectance (transmittance).

Another object of the invention is to provide an article and method of the above character in which intermediate and steep angle colors of a suitable multilayer interference filter are modified by the use of appropriate colorants carried by a substantially transparent, optically thick stratum suitably juxtaposed to the filter.

Another object of the invention is to provide an article and method of the above character in which intermediate colors have been reduced or eliminated in a shift in angle of incidence from 0° to some higher angle as, for example, 45°.

Another object of the invention is to provide an article and method of the above character in which there is an absence of significant color shift at angles of incidence greater than say 45°.

Another object of the invention is to provide an article and method of the above character which utilizes a combination of a substantially transparent optically thick, colorant carrying layer in conjunction with an interference coating.

Another object of the invention is to provide an article and method of the above character in which the optically thick colorant carrying layer and the interference coating are positioned so that the colorant operates in an essentially subtractive mode in its effect on the color producing properties of the filter.

Another object of the invention is to provide an article and method of the above character in which a material having a low index of refraction is utilized in the interference coating in order to develop a dramatic color shift with angle.

Another object of the invention is to provide an article and method of the above character in which high purity colors are obtained by the use of coatings having reflectance curves showing isolated spike-like features.

Another object of the invention is to provide an article and method of the above character in which two basic design configurations are utilized which filter the spectrum into a sequence of high reflectance regions surrounded by low reflectance regions and thus lend themselves to high purity color production.

Another object of the invention is to provide an article and method of the above character in which one basic design consists of periodic structures of alternating high and low index dielectric films.

Another object of the invention is to provide an article and method of the above character in which the other of the two basic designs consists of a periodic metal-dielectric structure on a relatively high reflecting opaque metal layer.

Another object of the invention is to provide an article and method of the above character in which numerous design possibilities are available utilizing the two basic designs by varying parameters such as component index values, thickness ratios and numbers of periods.

Another object of the invention is to provide an article and method of the above character in which colorants are incorporated selectively in a transparent superstrate or substrate to impose an angle-insensitive filtering action upon the angle sensitive properties of the multilayer coating suitably juxtaposed thereto.

Another object of the invention is to control the degree of specularity of the optical variable article so as to reduce appearance of "gaudiness".

Another object of the invention is to provide an article and method of the above character which is difficult to emulate and particularly so for potential counterfeiters.

Another object of the invention is to provide an article of the above character which can be mass produced.

Another object of the invention is to provide an article of the above character which can be produced utilizing roll coating machines.

Additional objects and features of the invention will appear from the following description in which the preferred embodiments are set forth in detail in conjunction with the accompanying drawings.

BRIEF DESCRIPTION OF THE DRAWINGS

FIG. 1 is a cross sectional view of an article incorporating the present invention in a reflection mode utilizing the combination of a colorant carrying superstrate and a multilayer interference coating.

FIG. 2 is a cross sectional view of an article incorporating the present invention in a transmission mode utilizing the combination of a colorant carrying substrate and a multilayer interference coating.

FIG. 3 is a cross sectional view of an article incorporating the combination of the present invention with a protective topcoat, the whole of which is mounted on the substrate.

FIG. 4 is a cross sectional view of another article incorporating the combination of the present invention utilizing the embedded construction.

FIGS. 5A and 5B are cross sectional views of articles incorporating the combination of the present invention utilizing a hot stamp transfer construction or a die-cut transfer construction.

FIG. 12 is a graph showing the computed overall transmittance of the isolated colorant carrying superstrate associated with the gold-to-green color shift design.

DETAILED DESCRIPTION

Figure 6:
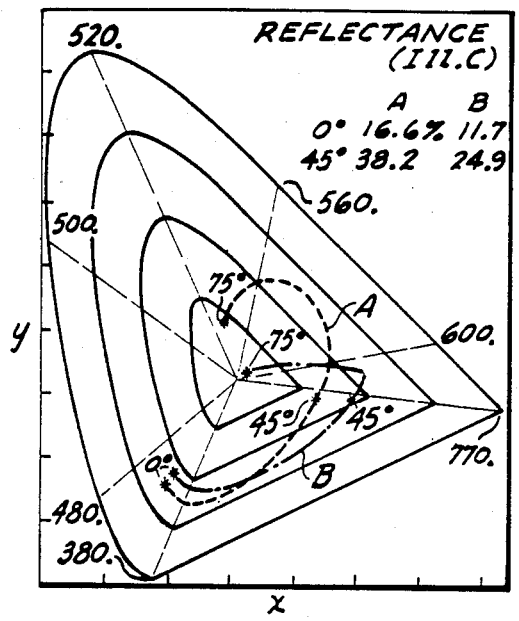
FIG. 6 is a chromaticity diagram of theoretical blue-to-red color shift designs with and without colorant in the superstrate.

The optically variable article having an enhanced color shift with angle consists of a structural element carrying subtractive colorant means and having first and second surfaces. A multilayer interference coating is carried on one of these surfaces. The subtractive colorant means serves to modify the color shift with angle properties of the interference coating.

The color shift with angle properties of a given multilayer interference coating are inherent in the design; and most often they entail the undesirable characteristics for optically by variable article applications of having rather high purity colors intermediate to and beyond those at 0° and some other desired angle of incidence, say 45°. The reasons for the intermediate and steep angle colors are related to the generally encountered more or less continuous shift to shorter wavelengths of the spectral profiles of these filters with increasing incidence angle wherein there is only moderate attendant change in basic profile (averaged with respect to perpendicular and parallel polarization) so that, for example, in a reflection mode device, continuously varying portions of the spectrum are being strongly reflected. In the present invention, the reflected color shift properties of the multilayer interference coating are modified by the optical properties of a superstrate which is positioned on the side of the multilayer interference coating that faces the incident light. The superstrate itself can be colored or carry a thin colored layer and thereby serves as subtractive colorant means. This concept involves incorporating selectively absorbing materials (absorbing or subtractive colorants) in the otherwise substantially transparent superstrate. This imposes an angle-insensitive filtering action upon the angle-sensitive properties of the multilayer interference coating lying beneath the subtractive colorant means. As set forth hereinafter, the combined filtering provided by the superstrate and the multilayer interference coating can markedly alter the color shift properties of the optical interference filter. Such a combination in addition to providing modified color shift with angle properties makes duplication of the combination as, for example, by counterfeiters substantially more difficult.

More particularly as shown in FIG. 1, the thin film optically variable article 11 consists of an element 12 which is substantially transparent. It is provided with first and second surfaces 14 and 16. A multilayer interference coating 17 is carried on one of the surfaces and is shown in FIG. 1 on the surface 14. Since the article 11 is being viewed in reflection from the side of the element 12, the element 12 can be called a superstrate because the superstrate 12 is on the side of the interference coating 17 facing the incident light. The viewer is indicated by the eye 18 which views a reflected ray 19.

In accordance with the present invention, the structural element 12 carries a dye or other form of colorant so that it serves as subtractive colorant means. The element 12 typically can be any conventional substantially transparent material such as glass, plastic and the like. The colorant can be incorporated in the material forming the structural element 12 or, alternatively, it can be incorporated into an optically thick layer on the superstrate. In order to be optically thick, such a layer must have a thickness in the range from about 1.5 to 2.0 microns at a minimum. The multilayer interference coating 17 can be of the two basic design configurations hereinafter explained.

With reference to FIG. 1, the optical system in reflection consists of an interference filter with angle-of-incidence-varying as well as wavelength-varying reflectance $R_F$ coupled with a superposed substantially transparent, optically-thick subtractive, colorant carrying stratum (i.e. colored superstrate) characterized by a rather low surface reflectance $R_s$ and an internal transmittance factor $e^{-\alpha s(\lambda)}$. The overall reflectance for this system is given by:

$$R = R_s + \frac{(1 - R_s)^2 R_F e^{-2\alpha s}}{1 - R_F R_s e^{-2\alpha s}}$$

$R_s$ is essentially independent of wavelength and (considering the average value for perpendicular and parallel polarized light) is also nearly constant with varying incidence angle until quite steep angles are reached. The quantity $e^{-\alpha s}$ does change with increasing incidence angle, but not in basic wavelength profile, since the variation is equivalent to an increase in colorant concentration. For angles up to and around 45°, the overall effect is not very significant, however, and thus it can be said that the superstrate is basically angle-insensitive in its optical properties.

Since $R_s$ is assumed to be a rather small value, it follows that the dominant behavior of the overall reflectance can be described by the simple expression:

$$R \approx R_F e^{-2\alpha s}$$

The prime contribution to the overall R is thus the product of the interference filter reflectance by the absorption factor of the subtractive colorant means. The effect of the colorant then is primarily subtractive with regard to the observed color from the filter by itself, and this effect can be rather dramatic at any given angle of incidence, primarily in blocking unwanted spectral components of the reflected color.

In FIG. 2 there is shown another article 21 incorporating the present invention which is provided with an element 22 of the same type as element 12 but which can be called a substrate rather than a superstrate since it can be disposed on either side of the interference filter in this case. It is provided with surfaces 24 and 26 with the surface 24 carrying a multilayer interference coating 27. The substrate 22 can be colored in the manner hereinbefore described for superstrate 12 or, alternatively if desired, can carry an optically thick colored coat to provide subtractive colorant means. The article 21 can be viewed from either side in transmission with the eye being indicated by the numeral 28 and the rays by 29.

Thus, it can be seen that the optical system in transmission consists of a filter with angle-of-incidence varying as well as wavelength varying transmittance $T_F$ coupled with an optically-thick, colorant carrying substrate characterized by a surface transmittance $T_s$ and the same internal transmittance factor as in the foregoing example. The overall transmittance for this system is given approximately by $T \approx T_F e^{-\alpha s}$.

In FIG. 3 there is shown a more specific embodiment of an article 31 incorporating the present invention which is provided with a protective coat and the whole of which is mounted upon a substrate which serves as a base. The overall combination consists of a substrate 32 which serves as a base. The substrate 32 can be formed of many different types of materials such as paper, glass, cloth, sheet plastic, leather and the like. It is provided with a surface 33 which carries the combination 34 of the present invention which is secured by an adhesive layer 36. The combination 34 consists of a structural element 37 in the form of a dyed superstrate providing subtractive colorant means and a multilayer interference coating 38 underlying the structural element 37 and facing the adhesive layer 36. As explained previously, the structural element 37 serving as a superstrate must be optically thick. It must therefore have a minimum thickness in the range of about 1.5 to 2.0 microns. If desired, a protective coat 39 can be provided which is carried by the combination 34. The protective coat is formed of a suitable material such as a transparent plastic to provide increased durability as, for example, scratch protection as well as chemical protection. In order to ensure that there is adequate adhesion between the substrate 32 and the coating 38, the surface of the substrate 32 can be prepared by adding a base coat (not shown). For example, for use with a porous substrate each as paper or cloth, the base coat can be a polymer which can be applied to the substrate and will fill in the interstitial passages in the substrate. This base coat can be applied by a printing process or alternatively by a hot stamp transfer process.

In FIG. 4, there is shown another article incorporating the present invention in which the combination 43 of the present invention is embedded in the article. Thus as shown, the article which can be in the form of a sheet of paper or other material 42 has the combination 43 embedded therein. The combination 43 consists of a structural element in the form of a dyed superstrate 44 of the type hereinbefore described which is provided with surfaces 46 and 47 and in which the surface 46 carries a multilayer interference coating 48 of the type hereinbefore and hereafter described. Thus it can be seen that the combination which can be any suitable size, for example, from $\frac{1}{8}$ inch or smaller in lateral dimensions to a much larger size and of any desired configuration as, for example, a circular shape, can be embedded in the sheet 42 during the time the latter is being made.

In FIG. 5A there is shown another embodiment of an article incorporating the present invention which can be utilized in connection with hot die stamp transfers. As shown therein, the article 51 consists of a flexible carrier sheet 52 which is made of a suitable polymer film such as polyethylene terephthalate (PET) having a surface 53. A combination layered structure 54 incorporating the present invention is carried by the sheet 52 and is secured thereto in a suitable manner such as by a release coat 56 of a conventional type. The combination 54 consists of an element 57 of the type hereinbefore described which is provided with a surface 58. The element 57 is in the form of a substantially transparent, optically thick subtractive, colorant carrying polymer hardcoat. An adhesive layer 61 is provided over the interference coating 59 and is provided with a surface which is non-tacky at room temperature. The product as thus far described can be considered to be a hot stamp transfer foil which can be shipped and subsequently used. This hot stamp transfer foil can be utilized in conjunction with conventional equipment to advance the foil in such a manner so that the adhesive surface 62 faces the substrate and then using a combination of heat and pressure utilizing a die of a given pattern, the adhesive layer 61 will be bonded to the substrate as, for example, a substrate such as substrate 32 in FIG. 3 in those areas delineated by the die pattern. After this transfer has been made, the carrier sheet 52 can be separated from the combination 54. After the transfer has been made, the carrier sheet 52 with the release coat thereon can be discarded. The final product will take the form shown in FIG. 3 with the exception that the protective coat 39 would not be present. With an article such as shown in FIG. 5A, very little thickness is added to a substrate such as the substrate 32 in FIG. 3 because the article as formed in FIG. 5A can be relatively thin. For example, the total thickness of the article as shown in FIG. 5A can be on the order of a small fraction of a mil.

In FIG. 5B there is shown an alternate embodiment of an article incorporating the present invention which can be utilized in die-cutting operations. It differs from the embodiment shown in FIG. 5A in that the adhesive 64 is different from the adhesive 61 used in FIG. 5A. Typically it can be a conventional pressure sensitive adhesive which is deposited upon the interference coating 59. A release liner 66 is secured to the adhesive 64 for protecting the adhesive until the article is used. In the use of the product shown in FIG. 5B, the pattern for the transferred article is defined by a die which cuts through the entire product as shown in FIG. 5B. At the time of application of the product to a substrate, the release liner 66 is removed and then the article is pressed down onto the base substrate so that the adhesive layer 64 adheres to the substrate. In the construction shown in FIG. 5, the release coat 56 may be eliminated if there is no desire to separate the polymer layer 52 from the structure 54 of the article. In such a situation, the combination 54 can be applied directly to the carrier layer 52.

In the embodiments of the invention shown in FIGS. 1–5, two basic design configurations are utilized in constructing the multilayer interference coatings employed in the combinations. These two basic design configurations filter the spectrum into a sequence of high reflectance regions surrounded by low reflectance regions and thus lend themselves in principle to high purity color production. The detailed spectral characteristics of each of these two basic design types can be rather widely controlled by controlling the specific design parameters. One design type of the interference coating utilized in the present invention can be characterized as an all-dielectric system consisting of a periodic structure of alternating high and low index dielectric films. The other design type can be characterized as a metal-dielectric system and consists of a periodic structure of alternating metal and dielectric layers on a relatively high reflecting opaque metal layer. Clearly, the latter type can only be utilized in a reflection type optical variable article. The former if used in a reflection mode device will normally require a blackening treatment of the adjacent substrate surface to ensure optimum color producing effects.

The periodic structure of the alternating high and low index dielectric layers for an all-dielectric design can be written in the form $$(\alpha L \cdot \beta H)^q,$$

where $\alpha$ and $\beta$ are units of quarterware optical thickness of the low and high index materials (represented symbolically by L and H) at some designated wavelength $\lambda_0$ and q is the number of periods in the stack.

The metal dielectric design consists of a structure which can be written in the form $$(M_1-\alpha D)^q-M_2,$$

where $M_1$ and $M_2$ are the metal components (generally different), D represents a dielectric layer and $\alpha$, q have the same meaning as in the expression for the dielectric design.

There are many variations which are obtainable within these two design frameworks by varying parameters, such as component index values, thickness ratios, number of periods, etc. Additionally, a number of variations and extensions of the designs can be obtained by using multicomponent periods, altering the period makeup to consider symmetrical periods, for example, of the form $(\alpha/2L - \beta H - \alpha/2L)$ and also adding odd stack elements on either side of the periodic structure to modify reflectance behavior in the low reflectance regions, etc. These designs can be further modified by the judicious choice of the subtractive colorants used in the superstrate (or substrate in the case of a transmission mode device).

All of the variations in the thin film component have in common the basic characteristic of filtering the spectrum into a sequence of bands of wavelengths of comparatively high and low reflectance. Moreover, the resultant spectral profiles tend to shift with change of incidence angle of the light to produce changes of color with angle shift. In the description of the present invention, some additional comments relating to specific characteristics of the two basic designs are set forth below.

The theory of periodic all-dielectric stack behavior is well known. The particularly important performance aspect of the periodic all-dielectric stack in the present invention is the fact that such a stack exhibits high reflectance bands in certain spectral regions wherein the reflectance increases steadily towards 100% with increasing number of periods. This performance, along with other general performance features can be established mathematically by those skilled in the art.

The other basic filter design type considered in the present invention, namely, the metal-dielectric stack, in its simplest form of a three-layer combination can be regarded as a Fabry-Perot reflection type interference filter. Such a design will be of the form $M_1-\alpha D-M_2$, where $M_2$ is a highly reflecting, essentially opaque metal layer and $M_1$ is a rather thin metal film with high absorption properties. This design will show a sequence of high and low reflectance wavelength regions corresponding closely to the conditions that give rise to the nodes and antinodes of the standing wave electric field established by the reflector $M_2$. In the vicinity of an antinode wavelength position, where the electric field intensity is a maximum, induced absorption can be shown to occur in the thin metal layer $M_1$ resulting in a low reflectance. At a node position $M_1$ has little effect on the reflectance of $M_2$ and the overall reflectance remains high. The separations between the node and the antinode wavelength locations and thus between the low and high reflecting regions correspond to quarter-wave optical thickness changes in the dielectric layer D. The basic reflectance profile for the three-layer metal-dielectric design as just described will be essentially retained in designs employing additional periods of $(M_1-\alpha D)$.

To obtain optimum performance in optically variable articles employing a metal-dielectric design, one would choose for $M_2$ the highest reflecting metal consistent with overall good durability properties, for D the lowest usable index material, and for $M_1$ a metal with high absorption properties. High potential absorption occurs for metals with a high nk product. Such generally is the case for the class of grey metals for which n is approximately equal to k.

Both the periodic all-dielectric designs and the metal-dielectric designs, as described above, have certain general features in common—especially the aforementioned feature of filtering the spectrum into a sequence of comparatively high and low reflectance regions. There are also significant points of contrast. Both types of design would tend to employ for the low index dielectric material the lowest index usable material in order to enhance the sensitivity to color shift with angle properties. Both types would also tend to employ higher-order interference (within a certain range) for the same purposes. An important contrast, however, is that for all-dielectric designs the reflectance in a given high reflectance band increases with the number of periods, as already stated, whereas for a metal-dielectric design the highest reflectance is achieved already with the simplest design, namely a three-layer coating.

Specific designs reflecting the concepts of the present invention will now be set forth. The discussion assumes in all cases the use of Illuminant C light source. A chromaticity diagram for a theoretical blue-to-red color shift optical variable article, employed in a reflection mode, using an all-dielectric multilayer interference filter design is shown in FIG. 6. The computed chromaticity trajectory is shown plotted for angles of incidence ranging from 0° to 75°. The parameters for the all-dielectric stack in this example have been specifically chosen so as to produce in reflection a blue color at 0° and a shift towards a red color at 45°. The 0°, 45° and 75° incidence angle points are noted by asterisks on the trajectory for the two curves A and B. Curve A represents the chromaticity for the case of no colorant carried by the superstrate and curve B represents the chromaticity for a colorant subtractive carrying superstrate. The curve B starts out with a high purity color as shown in FIG. 6 at 0°, in the 380 to 480 nanometer range and spirals into the achromatic or no color point at 75°. The design for the case of no colorant in the superstrate is set forth below:

$[S]-[(4.172L)(0.96H)]^5-[S']$    (Design A in FIG. 6)

where S is the superstrate and S' is the substrate, where L is a low index material in quarter waves of a suitable type, such as magnesium fluoride, and H is high index material in quarter waves of a suitable type, such as a mixed oxide of the type disclosed in U.S. Pat. No. 3,034,924. The superstrate is formed of any suitable substantially transparent material, such as a glass or plastic. (The refractive index of the superstrate was assumed here to be 1.56, but may vary from 1.4 to 1.8.) It is desirable that the substrate exhibit no significant reflection. For this purpose the surface adjacent to the filter can be provided with a blackening agent or absorber. If there is significant reflection from the substrate, this will rather generally tend to dilute or water down the colors from the interference filter. The index of refraction of the substrate can be characterized by a complex number such as:

$N_s' = 1.55 - i0.005$ where the imaginary part (0.005) is the absorption coefficient.

For a blue-to-red color shift article using an appropriate superstrate subtractive colorant the design is as follows:

$$[S^*] - [(4.219L)\,(0.97H)]^5 - [S'] \qquad \text{(Design B in FIG. 6)}$$

Here the index of refraction of the superstrate is a complex number of the form $N_S^* = 1.56 - i\delta$, where $\delta$ is a quantity that is dependent on the wavelength and characterizes the absorption or subtractive properties of the colorant.

The match point or design wavelength for both of the above designs is 550 nanometers.

Figure 7A:
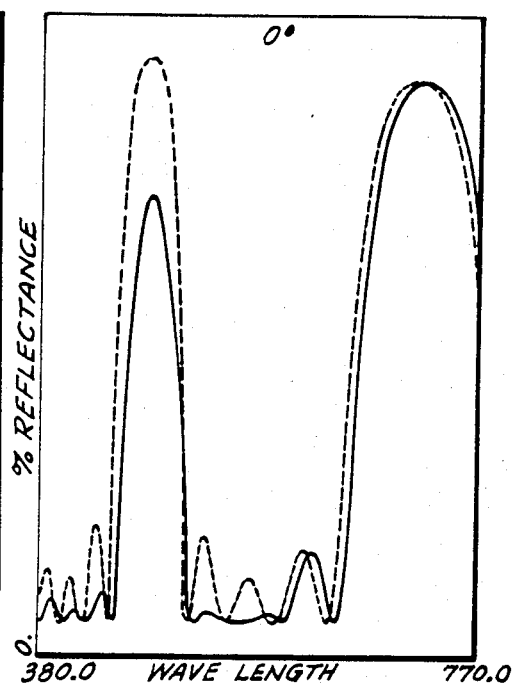
FIGS. 7A, 7B and 7C are graphs showing the computed reflectance curves of the blue-to-red designs of FIG. 6 for 0°, 45° and 70° incidence angles respectively.
Figure 7B:
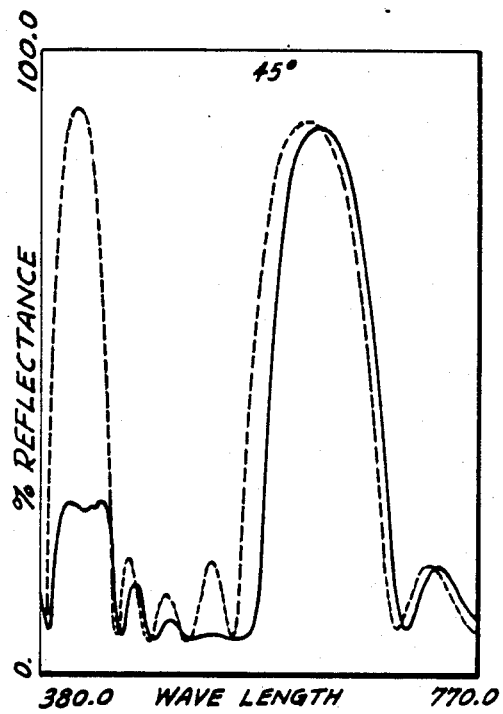
Figure 7C:
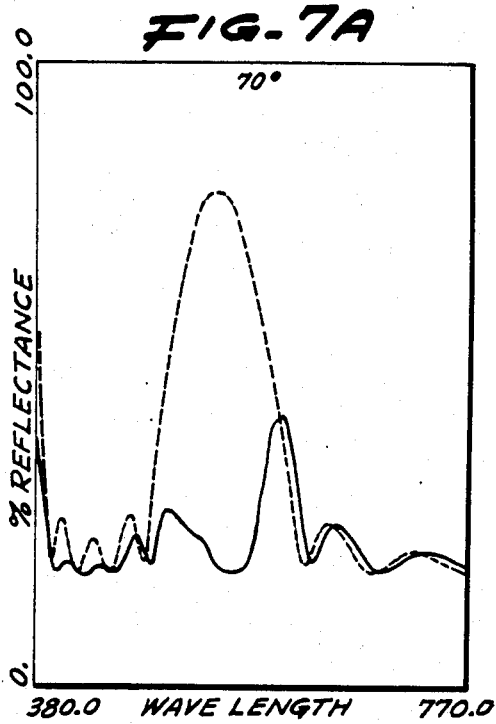
Figure 8:
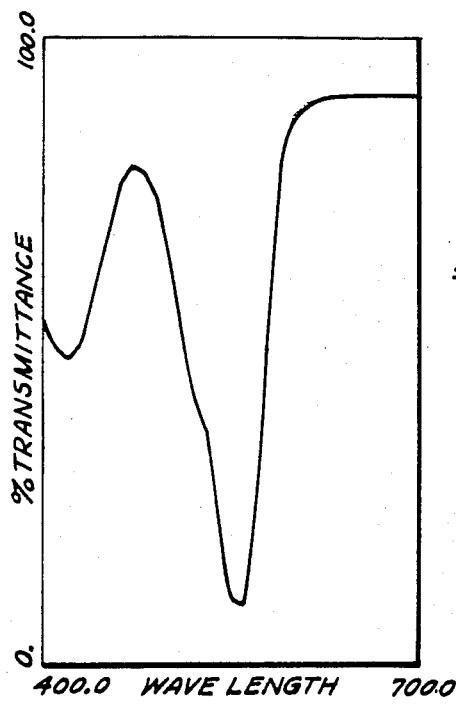
FIG. 8 is a graph showing the computed overall transmittance of the (isolated) colorant carrying superstrate associated with the blue-to-red color shift design.

In FIGS. 7A, 7B and 7C, there are shown computed reflectance curves over the range 380 to 770 nanometers for 0°, 45° and 70° of the above two designs with and without the colorant in the superstrate to illustrate the working principle of combining a selective absorber (subtractive colorant) with an angle sensitive multilayer interference filter. The broken line curves in the figures represent the design without colorant in the superstrate, whereas the solid line curves are for the design with colorant in the superstrate or carried by the superstrate. FIG. 8 shows the computed overall transmittance of the colorant carrying superstrate by itself that is associated with this blue-to-red color shift design. It can be seen that the colorant utilized has a transmission band in the middle of the blue range at approximately 470 nanometers, then quite sharply cuts off most of the green spectral region centering around 550 nanometers and then becomes transparent again at longer wavelengths to allow a red reflection to come through.

When used in combination with an interference coating which has a blue spike, what is seen is the blue reflectance band along with a lower order reflectance band just beginning to come into the red region. When the object or article is tipped at 45° to the incident light, the properties of the colorant carrying superstrate do not shift substantially but the properties of the interference filter do shift. Now the incipient red reflectance band at 0° becomes more prominent in that it shifts into the visible range whereas the blue spike seen at normal incidence has now shifted close to the ultraviolet and becomes substantially blocked by the short wavelength cutoff of the subtractive colorant. Thus in the vicinity of 45°, a strong red reflection is being given. At an angle of 70° incidence, the reflectance band that was at 45° in the red has now shifted over into the green region at around 550 nanometers and is now effectively blocked out by the green absorption or subtractive in the colorant. If the colorant were not present, a vivid green colorant would otherwise be seen. By means of the blocking or subtractive action by the colorant, there is reduced reflectance and very little color at this latter angle. In going from the blue to the red, there is a region of transition which cannot be altogether avoided. Here the color goes essentially from a blue through a purple/magenta into a red. The use of the subtractive colorant will modify the transition to some extent, in this case primarily by enhancing the purity of the red. However, the subtractive colorant is very effective in reducing the steep angle colors that otherwise develop beyond 45° incidence.

In the blue to red design which is shown in FIG. 6 it can be seen that what is ideally desired is a "window" in the superstrate at about 470 nanometers wavelength that allows the blue reflectance peak of the filter at 0° incidence to come through and a second "window" at around 620 nanometers (both essentially stationary with varying incidence angle) that will pass the red reflectance peak that develops at around 45° incidence. The remainder of the visible spectrum should be absorbed or subtracted by the superstrate to cause a substantial change in the intermediate and steep angle properties of the optical variable articles arising from the multilayer filter component. In practice, by using currently available subtractive colorants for the superstrate in conjunction with a multilayer filter component, the purple/magenta intermediate colors are not substantially altered. The elimination or subtraction of the steep angle colors by the colorant, on the other hand, is very dramatic.

Thus it can be seen that the combination of the subtractive colorant carrying superstrate with the all-dielectric multilayer interference filter provides an effective blue-to-red color shift with angle device.

For the third dimension of color, namely, luminance, which is represented in this case by the luminous reflectance with respect to Illuminant C, the values at 0° and 45° are given for both the A and B designs in the chart appearing in FIG. 6. Illuminant C is standard and well known to those skilled in the art.

Figure 9:
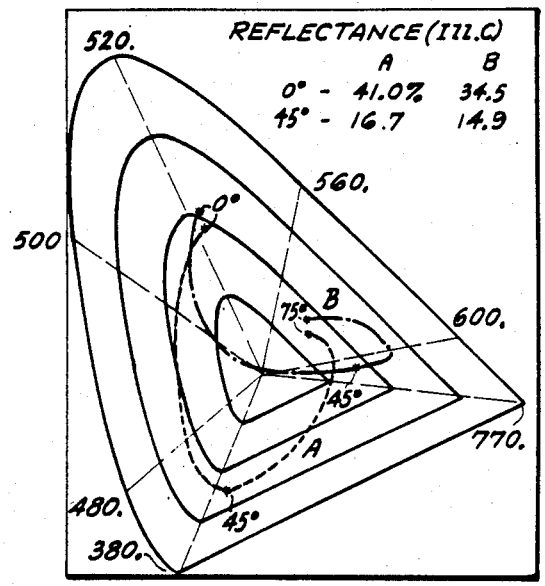
FIG. 9 is the chromaticity diagram for theoretical green-to-orange color shift designs, with and without colorant in the superstrate.

FIG. 9 is a chromaticity diagram for a theoretical green-to-orange subtractive color shift device used in a reflection mode. The design for a superstrate without colorant is as follows:

$$[S] - [(4.626L)\,(1.067H)]^5 - [S'] \qquad \text{(Design A in FIG. )}$$

The design for a superstrate containing an appropriate subtractive colorant is set forth below:

$$[S^*] - [(4.566L)(1.054H)]^5 - [S'] \qquad \text{(Design B in FIG. 9)}$$

The materials and the indices of refraction are the same as for the design shown in FIG. 6, except that the $\delta(\lambda)$ values for the superstrate are different. The match point or design wavelength is at 550 nanometers. Again the 0°, 45° and 75° angle points are indicated by asterisks for the two designs. As can be seen from FIG. 9, Curve B at 0° a strong green color is observed. The curve then passes through the achromatic or no color point at intermediate angles to a reddish orange color in the vicinity of 45°.

The luminous reflectance values for both designs at 0° and 45° are given in the table in the upper right hand corner of FIG. 9.

Figure 10:
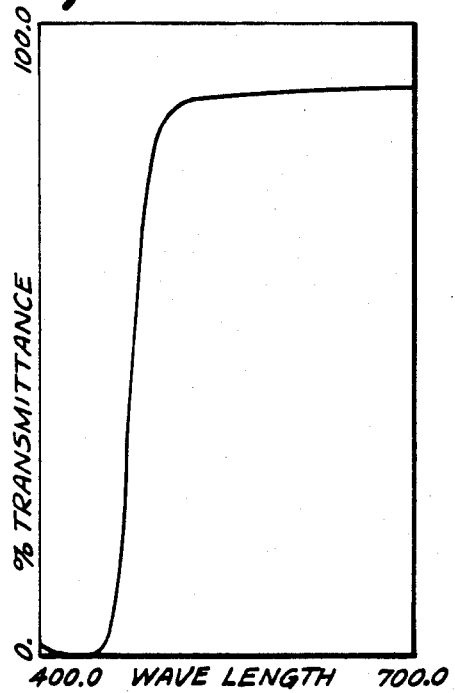
FIG. 10 is a graph showing the computed overall transmittance of the (isolated) colorant carrying superstrate associated with the green-to-orange color shift design of FIG. 9.

The computed overall transmittance for the isolated subtractive colorant carrying superstrate associated with the green-to-orange color shift design is shown in FIG. 10.

Figure 11:
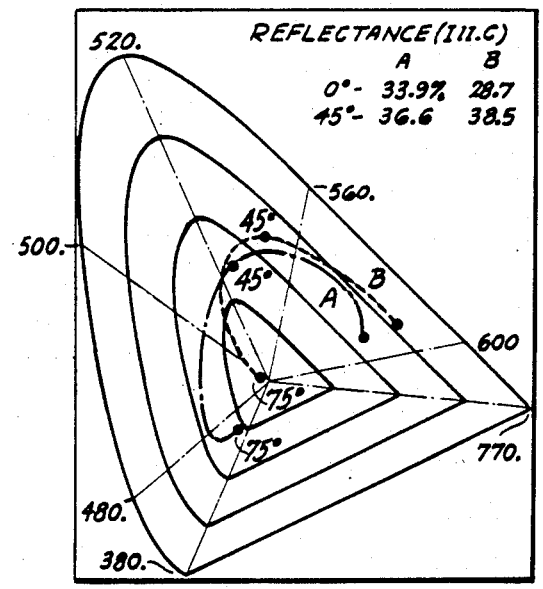
FIG. 11 is a chromaticity diagram for theoretical gold-to-green color shift designs, with and without colorant in the superstrate.

FIG. 11 is a chromaticity diagram for a gold-to-green color shift device used in a reflection mode. The design with a superstrate without colorant is as follows:

$$[S] - Pd_1 - 4.365L - Pd_2 - 4.365L - Pd \text{ (opaque)} \qquad \text{(Design A in FIG. 11)}$$

where Pd is palladium and L is $SiO_2$ in quarterwaves. The physical thickness of the palladium layers is as follows:

$d_{Pd_1} = 5$ nanometers $d_{Pd_2} = 10$ nanometers

The bottom palladium layer labelled "opaque" should be less than 0.1% transmitting and nominally over 1000 Angstroms in thickness.

The index of refraction of the superstrate is the same as in the foregoing examples.

Again the match point or design wavelength is 550 nanometers.

The design for a superstrate with an appropriate subtractive colorant is as follows:

[S*]—Pd$_1$—4.46L—Pd$_2$—4.46L—Pd (opaque)     (Design B in FIG. 11)

The other parameters for this design are the same as for the design without colorant in the superstrate. The $\delta(\lambda)$ values for the superstrate S* again are different than in the foregoing examples. As can be seen from Curve B in FIG. 11 at 0° a strong gold color is produced. At an intermediate angle a green color is produced and at a high angle of 75° the curve B passes through the achromatic or no color point.

The luminous reflectance values for these designs are shown in the table in the upper right hand side of FIG. 11.

The computed overall transmittance of the isolated subtractive colorant carrying superstrate associated with the gold-to-green color shift design is shown in FIG. 12.

From the foregoing it can be seen that three examples of color shift designs have been provided with each incorporating a substractive colorant carrying superstrate to modify the reflected color shift with angle properties of the associated filter by providing subtractive colorant means which is external to the multilayer interference filter. Two of these designs ("blue-to-red") and ("green-to-orange") utilize all-dielectric filters. The third design ("gold-to-green") uses a metal dielectric stack. In principle, all-dielectric and metal-dielectric designs can be used more or less interchangeably for a given color shift with angle design. The blue-to-red design shown in FIGS. 6 and 7A, B, C and 8 utilizes a subtractive colorant carrying superstrate that incorporates a mixture of Rhodamine B (magenta dye) and Keystone 3810 Thioflavine TCN (yellow dye). This combination is not necessarily an optimum colorant for a blue-to-red optical variable device or article due primarily to the presence of unwanted absorption in the blue spectral region. The combination does effectively cut off steep angle colors and also enhances the red purity around 45° incidence rather substantially. There is, however, a detectable loss of purity in the blue as well as a loss of reflectance at normal incidence. It should be appreciated there is always some loss of luminous reflectance from use of a subtractive colorant carrying superstrate. In many cases this is not important. However, in this case the loss at normal incidence is significant due to the low starting reflectance. The above noted dye combination is the best compromise using known materials.

The green-to-orange color shift design shown in FIG. 9 and the gold-to-green design shown in FIG. 11 use Solvent Yellow 42 dye in different concentrations.

The designs for the filters for each of these color shift types have been designated in the foregoing descriptions. It will be noted that in each example the design construction is slightly different for the two cases of the superstrate with and without colorant. This was established so that the normal incidence dominant wavelength values would be equal for the two designs. As pointed out above, the chromaticity trajectory is plotted in every case over the range of incidence values from 0° to 75° as indicated by asterisks. Also as pointed out above, luminous reflectance values at 0° and 45° are provided to give data concerning this third dimension of the color.

The foregoing two classes of designs, the all-dielectric filters and the metal-dielectric filters have common features which make them applicable for use in optically variable articles. On theoretical grounds the all-dielectric filters offer greater overall potential for design variability for use in optical variable articles provided no limit is placed on the number of layers used or the specific structure of the all-dielectric stack. However, some of this apparent theoretical advantage is lost by the spectral averaging effects involved in determining the color properties of any given design. From a practical point of view in producing reflection mode devices, moreover, a metal dielectric filter design appears to be more practical for roll coating production because of the fewer layers required. Typically for a metal-dielectric filter, a layer structure as simple as three layers can be utilized and still provide very good optical variable article performance, since as already noted the highest ratio of maximum to minimum reflectance is already achievable with such a simple design. By contrast in order to establish high spectral purity along with reasonable luminous reflectance values in any practical all-dielectric stack design, a minimum of five layers and probably more may be required. The need for many layers tends to make such a design relatively impractical in any high volume coating production. Also, in optically variable article applications higher order interference is often necessary, and thus the use of substantial film thickness of individual layers can be required to obtain the best performance. This in turn can give rise to substantial mechanical stress within the coating with attendant durability problems, which has a greater tendency to arise with the use of increased number of layers in all-dielectric designs.

In the foregoing discussion, it has been tacitly assumed that all layer boundaries in films and superstrate or substrate were plane parallel and smooth, so that the reflecting and/or transmitting properties of the assemblies could be characterized as essentially specular in character. This was important in establishing the basic color shift with angle properties of the present invention. Clearly, a significant departure from specularity in a thin film optical variable article would seriously detract, if not destroy, its intended usefulness as herein described by introducing averaging effects that would tend to wash out the color effects normally seen. On the other hand, a certain degree of diffuseness of the reflected (transmitted) light may in some cases be desirable. If the diffuseness is suitably limited in extent, there is rather little loss in color purity, or in definition otherwise of the overall color shift with angle properties of the optically variable article, since in such cases light scattering is limited to narrow angle effects. Moreover, by this means a more pleasing appearance may be gained, reducing any "guadiness" that might be associated with specular colors of high liminance and purity. Such diffuseness can be introduced rather effectively, for example, by the judicious choice of materials and/or processing used for the outermost optically thick layer of the device.

The present invention has many applications some of which may not be apparent at the present time. One particular application is its use as an anticounterfeiting device. Because of the difficulty of duplicating the optical properties of combinations of multilayer interference filters and subtractive colorant carrying superstrates or substrates, small portions or areas of the same can be incorporated in the labels of designer apparel, computer programs, video cassettes and any other type of article in which it is likely that counterfeiting may be attempted. In addition, the designs can be utilized for decorative purposes in costumes and scenery in theaters to create special effects. Other than having small areas of the optically variable article, it is possible to form a trademark or logo from the article of the present invention. For example, designer label clothes could have the name of the designer formed out of an article normally in sheet form as produced in a roll coating operation of the material of the present invention.

The present invention particularly lends itself to anticounterfeiting applications because duplication of the same would be very difficult and would require the application of very high technology to support a counterfeiting operation.

From the foregoing it can be seen that the optically vaiable article applications offer an exciting new technological area for exploitation of optical thin films. The interference coatings and the dyed substrates in combination possess a unique signature which cannot be copied without duplicating an essentially equivalent structure in the article, which as hereinbefore explained is difficult to do because of the very high technology which is involved. Duplication on color copying machines would be impossible, bacause the areas which carry the attributes of the present invention would copy as black or at most as an angle insensitive color.

What is claimed is:

1. In a thin film optically variable article having substantial color shift with varying angle of light incidence and viewing, an optically thick substantially transparent structural element carrying a colorant and having first and second surfaces and a multilayer interference coating carried on one of said first and second surfaces, said colorant being external of the multilayer interference coating, said colorant serving to modify in essentially a subtractive mode the color at normal incidence and the color shift with angle of the multilayer interference coating as seen by transmission of light through the article.

2. In a method for providing a color shift with angle in transmitted light by the use of a multilayer interference coating carried by a substantially transparent structural element, causing the light to pass through the structural element and the interference filter and selectively absorbing in essentially a subtractive mode unwanted colors in the light in a manner which is substantially independent of angle to provide an abrupt color shift from one color to another color at two different angles of incidence.

3. in a thin film optically variable article having substantial color shift with varying angle of light incidence and viewing, an optically thick structural element having first and second surfaces, a multilayer interference coating carried on one of said first and second surfaces and producing an inherent color shift with angle and subtractive colorant means external of the multilayer interference coating and on the side of the multilayer interference coating facing the incident light, said subtractive colorant means in combination with the multilayer interference coating serving to modify the inherent color shift induced by the multilayer interference coating to provide a discrete color shift from one distinct color to another distinct color at two different angles of incidence and substantially no color at another angle of incidence.

4. An article as in claim 3 wherein said multilayer interference coating is formed of all dielectric layers.

5. An article as in claim 3 wherein said multilayer interference coating is formed of metal and dielectric layers.

6. An article as in claim 3 wherein said another angle of incidence is intermediate to the two angles of said incidence.

7. An article as in claim 6 wherein said another angle is between 0° and 45°.

8. An article as in claim 3 wherein said another angle of incidence is greater than the two angles of incidence.

9. An article as in claim 3 wherein said one distinct color is blue and another distinct color is red.

10. An article as in claim 3 wherein said one distinct color is green and said another distinct color is orange.

11. An article as in claim 3 wherein said one distinct color is gold and wherein another distinct color is green.

12. An article as in claim 3 wherein said structural element is opaque and wherein the distinct colors are seen by reflection.

13. An article as in claim 3 wherein the structural element is transparent and the distinct colors are seen by transmission.

14. An article as in claim 3 wherein said subtractive colorant means is carried within the structural element.

15. An article as in claim 3 wherein said subtractive colorant means is carried externally of the structural element.

16. An article as in claim 3 wherein said multilayer interference filter is angle sensitive in its optical properties and wherein said subtractive colorant means is a selective absorber and is substantially angle insensitive in its optical properties.

17. In a thim film optically variable article having substantial color shift with varying angle of light incidence and viewing, a multilayer interference coating producing an inherent color shift with angle, and subtractive colorant means external of the multilayer interference coating on the side of the multilayer interference coating facing the incident light, said subtractive colorant means in combination with the multilayer interference coating serving to modify the inherent color shift produced by the multilayer interference coating to provide a discrete color shift from one distinct color to another color at two different angles of incidence and substantially no color at another angle of incidence.

18. An article as in claim 17 wherein said another angle is intermediate to the two angles of incidence.

19. An article as in claim 17 wherein said another angle is greater than said two different angles of incidence.

20. In a method for providing color shift with angle in reflected light by the use of a multilayer interference coating carried by a structural element and providing an inherent color shift with angle, causing light to impinge upon the multilayer coating, and selectively absorbing in essentially a subtractive mode unwanted colors to provide an abrupt color shift from one distinct color to another distinct color at two different angles of incidence.

21. A method as in claim 20 together with the step of reducing colors exhibited by the multilayer interference coating intermediate to 0° and a designated angle of approximately 45°.

22. A method as in claim 20 wherein the step of absorbing the unwanted colors is performed prior to the light impinging upon the multilayer interference coating.

23. In a method for providing a substantial color shift with varying angle of light incidence and viewing by the use of a multilayer interference coating and subtractive colorant means, the method comprising causing light to impinge upon the multilayer interference coating to provide an inherent color shift with angle and causing the same light to impinge upon the subtractive colorant means to selectively absorb in essentially a subtractive mode unwanted color from the inherent color shift provided by the multilayer interference coating to thereby modify the inherent color shift produced by the multilayer interference coating to provide a discrete color shift from one distinct color to another distinct color at two different angles of incidence.

24. A method as in claim 23 wherein the selective absorption is such so that there is substantially no color at other angles of incidence.

25. A method as in claim 20 wherein another angle of incidence is at an angle intermediate the two different angles.

26. A method as in claim 20 wherein said another angle is at an angle which is greater than said two different angles.

27. A method as in claim 20 wherein said color shift with angle is produced in reflected light and wherein the incident light impinges upon the subtractive colorant means before it impinges upon the multilayer interference coating.

28. A method as in claim 20 wherein said color shift with angle is produced in transmitted light.

* * * * *